United States Patent
Mordaunt et al.

[11] Patent Number: 5,949,805
[45] Date of Patent: Sep. 7, 1999

[54] PASSIVE CONDUCTIVELY COOLED LASER CRYSTAL MEDIUM

[75] Inventors: David W. Mordaunt, Redondo Beach; Randall J. St. Pierre, Santa Monica; George M. Harpole, Torrance; James M. Zamel, Hermosa Beach, all of Calif.

[73] Assignee: TRW Inc., Redondo Beach, Calif.

[21] Appl. No.: 08/935,265

[22] Filed: Sep. 22, 1997

[51] Int. Cl.⁶ ............................................. H01S 3/04
[52] U.S. Cl. ............................. 372/34; 372/36; 372/75
[58] Field of Search ........................ 372/34–36, 69, 372/70, 75

[56] References Cited

U.S. PATENT DOCUMENTS

| | | | |
|---|---|---|---|
| 4,563,763 | 1/1986 | Kuhn | 372/35 |
| 4,637,028 | 1/1987 | Kahan | 372/34 |
| 4,761,789 | 8/1988 | Fukae | 372/34 |
| 4,949,346 | 8/1990 | Kuper et al. | 372/36 |
| 5,317,585 | 5/1994 | Gregor | 372/35 |
| 5,555,254 | 9/1996 | Injeyan et al. | 372/35 X |
| 5,572,541 | 11/1996 | Suni | 372/70 |
| 5,636,239 | 6/1997 | Brusselbach et al. | 372/70 |
| 5,781,580 | 7/1998 | Winik | 372/75 X |

*Primary Examiner*—John D. Lee
*Attorney, Agent, or Firm*—Michael S. Yatsko

[57] ABSTRACT

There is provided an optically pumped laser apparatus 10 which includes a heat conductive assembly 14 which is affixed to a solidstate yag laser crystal medium for generating a laser beam 49 within the laser crystal medium 12. The heat conductive assembly 14 comprises a heat diffusing element 32 which serves to diffuse the heat that is generated through the cooling surfaces 24 and 26. It includes a heat discharging structure 33 for removing the heat from the system. The efficiency of the laser system is improved by the geometry of pumping the crystal laser medium along the paths shown by the arrow 40 and to directing heat removed by the heat conductive assembly along the arrows 42, which paths are normal to one another and which provide an effective geometry that minimizes temperature variations within the laser crystal 12 to provide a low value for the OPD of the system. The heat conductive assembly 14 may include a liquid type heat exchanger 43, or heat pipes 33 to facilitate removal of the heat from the diffuser 32.

21 Claims, 3 Drawing Sheets

PASSIVE CONDUCTIVELY COOLED LASER CRYSTAL MEDIUM

BACKGROUND

1. Field of Invention

This invention relates generally to the optical pumping and techniques for cooling a solid state crystal laser medium and more particularly to passively cooling the laser medium by the removal of heat by heat conductive elements in heat conductive relationship with the laser medium to produce an isotropic temperature condition in the laser medium.

2. Discussion

High intensity, high power solid state laser systems that are optically pumped generate a great deal of heat within the laser slab. Unless the temperature is controlled by appropriate techniques that are consistent with the application environment, the systems can be very inefficient and even inoperative. For example, when such laser systems are used in outer space, the cooling techniques that can reasonably be used are limited. It is known in the case of terrestrial applications for such systems to use fluids as the cooling medium. Fluids as coolants require circulating pumping equipment particularly if water is used; or in the case of air the use of blowers. In any event, such use of fluid coolants present the risk of contaminating the laser medium surfaces which could interfere with the quality of the laser beam that is generated. Additionally, fluids can freeze in certain environments, damaging the hardware.

As is well-understood in this art, beam quality of these systems is a function of the uniformity of the temperature throughout the laser medium as opposed to the absolute temperature of the medium. Cooling of the medium is directed at creating an isotropic condition so that as the generated laser beam is propagated through the laser medium the wave form will have a uniform phase across the entire beam. It is the temperature variation encountered in the laser medium which varies the refractive indices encountered in its path causing it to distort. This difference in phase across the output beam is known as the optical path difference ("OPD").

As the beam experiences a certain amount of divergence its beam quality is inversely proportional to the level of the OPD. This relationship can be expressed mathematically:

$$\text{Equation: Beam Quality} = e^{\frac{1}{2}(2\Pi OPD_{rms})^2}$$

It will be appreciated that small increases in OPD, which is taken as the root mean square of the amplitude of the wave form, will result in a significant degradation of the beam quality. Understandably the design and construction of laser systems has as one of its primary objectives to provide an isotropic temperature profile within the laser medium. Another factor that affects OPD is the geometric relationship of the direction of the optical pumping and temperature control elements applied to certain face portions of the lasing medium. Generally the lasing medium has opposing polished faces and opposing roughened face portions that diffuse incident radiation. With respect to the geometry of pumping and cooling the laser it has been found that pumping the laser from only one surface and cooling it from another opposite surface results in very poor beam quality and is not acceptable. Improved beam quality results when the geometry is symmetrical and involves optical pumping from opposite faces of the medium and the cooling path is also imposed on opposing faces and transverse the optical pumping path. This is known as a two-sided symmetrical pumping and two-sided cooling. The OPD for such a geometry of pumping and cooling will result in greatly improved results in the beam quality.

The manner of cooling the laser medium plays a significant role in determining beam quality. Previously known techniques employed heat exchangers using water or other suitable fluids to flow over the face portions to remove the heat. As a heat exchanger it required pumping equipment to recirculate the liquid over the face portion. The opportunities for contamination of the liquid presented the problem of depositing contaminants on the laser face portion which interfere with the internal reflection of the incident beam inside the face. Such known disadvantages of heat exchanger techniques are characteristic of convective cooling. Convective cooling techniques with respect to the description of this invention are defined as employing pumping equipment and recirculating liquids and gases directly across the face portions to remove the heat. This invention employs conductive cooling techniques which employ thermally conductive layers of materials placed against the cooling face portions for conductively transferring the heat away from the laser medium absent of coolant passing over the laser medium.

As described earlier, the significant advantage of conductive cooling techniques obviates the problem of contaminating the face portions of the laser medium when using fluid exchangers for cooling. The advancement in the use of conductive cooling as described herein allows cooling of the laser medium without the use of circulating fluids and does not require the use of circulating pump equipment. Conductive cooling also affords the opportunity of being able to use liquid type heat exchange systems but eliminates the risk of introducing contaminants to the faces of the laser medium. The invention also provides for the use of alternative types heat exchangers which are completely divorced from the faces of the heat exchanger being affixed to the conductive assembly to effectively dissipate the heat without the risk of contamination.

SUMMARY OF THE INVENTION

There is provided in this invention an optically pumped laser comprising a solid state laser medium adapted to generate a laser beam wave that is propagated uniformly in a zig-zag path by internal reflection through the medium, said laser medium having first face portions through which the laser medium is excited and second cooling face portions through which the laser medium is conductively cooled. The conductively cooled face portion has affixed a thermally conductive assembly which includes at least a thermally conductive layer, such as copper, adhered to the cooling face portion with a conductive adhesive film. The thermally conductive assembly includes a protective evanescent film between the laser crystal surface and the conductive adhesive to prevent any deleterious effect on the highly reflective property of the laser medium surface. The thermally conductive assembly additionally may include means for dissipating the heat associated with the heat diffusing element.

The pumping face portions are roughened to provide a diffuse surface to the incident pumping radiation. The geometry of the face portions for pumping and cooling the laser medium are such that the paths are transverse to one another. The laser medium is optically pumped through the opposing diffuse surface face portions and the heat conductive assembly is affixed to each of the opposing cooling face portions that extend normal to the pumping face portions.

BRIEF DESCRIPTION OF THE DRAWINGS

These and other features, aspects, and advantages of the present invention will become better understood from the following description, appended claims, and accompanying drawings:

DETAILED DESCRIPTION OF THE PREFERRED EMBODIMENTS

Figure 1:
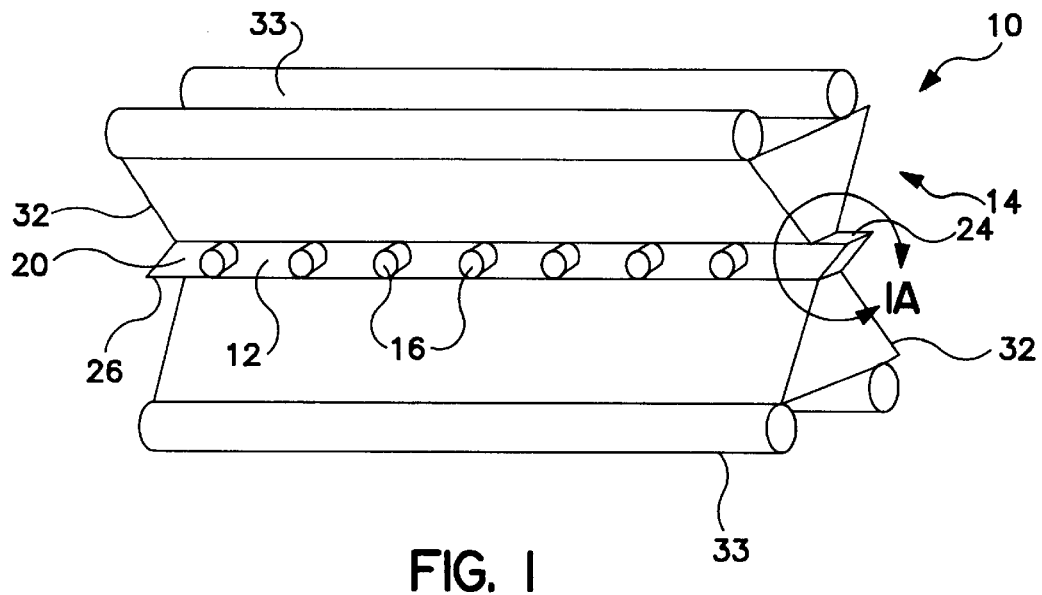
FIG. 1 is a perspective of the laser medium having affixed the thermally conductive assembly.

Referring to FIG. 1 there is shown for purposes of illustration a perspective of the laser system identified generally by the numeral 10. Central to the laser system is the laser medium 12 and the thermally conductive assembly identified generally with the reference numeral 14 and the pumping diode arrays 16. The pumping diode arrays for purposes of illustration are shown spaced apart from the face portions 20 and 22 of the laser medium 12. In practice the arrays are directly against the pumping face portions 20 and 22. The heat conductive assembly 14 comprises a heat diffuser element 32 and a heat discharging structure 33. Each assembly 14 is affixed to the upper and lower cooling face portions 24 and 26 of the laser medium 12. It will be understood that the conductive assembly 14 is characterized as a passive technique since, unlike prior known active cooling systems that pump fluid through heat exchangers abutted against the laser medium, this technique maintains the face of the laser medium free of fluid contact. The passive system of this invention is designed to establish an even or uniform temperature throughout the laser medium so that an energy beam entering the laser medium will propagate through it without encountering different indices of refraction through the medium, which result from temperature differences, and the beam will move through as a planar wave front. It will be understood that cooling is not for the purpose of achieving an absolute temperature level of the lasing medium but rather to avoid temperature variations through the lasing medium thereby maintaining an isotropic condition.

Figure 1A:
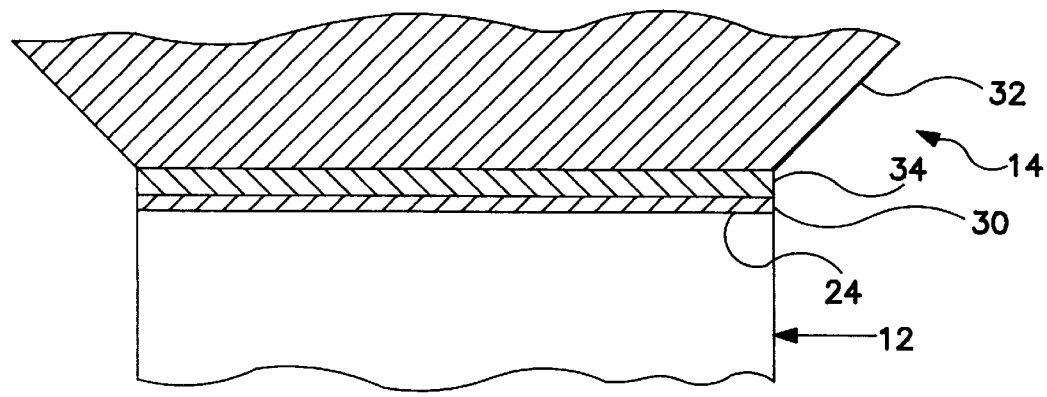
FIG. 1a is an enlarged detail of the encircled portion of the perspective of FIG. 1 showing the thermally conductive assembly to which is affixed the heat diffusing element to the laser medium.

Referring to FIG. 1A, there is shown an enlarged detail of a section of the laser system 10 illustrating in diagrammatic form the structure of the heat conductive assembly 14. The laser medium 12 is prepared with an evanescent wave coating 30 applied to the cooling face portions 24 and 26. The evanescent wave coating 30 is a 2 micron thick transparent coating that has a low index of refraction of 1.5 or less so that the radiant energy pumped into the medium experiences total internal reflection within the laser medium. The coating 30 comprises a film of silicon dioxide ($SiO_2$) available from Litton Airtron Synoptics of Charlotte, N.C. The evanescent wave coating 30 can be a dielectric material that is transparent to radiation at 1064 nm. For example an equivalent thickness of magnesium fluoride ($MgF_2$) may be used to advantage as the coating 30. The heat diffusing element 32 is affixed to the laser medium by means of an adhesive film 34 which is curable at room temperatures. The evanescent coating is a dielectric material and protects the medium surface against any deleterious effect from the bonding material 34. The bonding material 34 is a silicone based adhesive and is heat conductive which includes boron nitride. The thickness of the heat curable silicone film 34 is in the range of 2–6 microns and it is available from Nusil Technology of Carpinteria, Calif., identified as CV-2946. The bonding material 34 has a thermal conductivity of $3.8 \times 10^{-2}$ watts per centimeter degree kelvin. The material 34 serves as a bonding agent and also as a heat conductive layer. Another suitable bonding material is available from GE Silicones in Waterford, N.Y. identified as a silicone rubber RTV615A.

The heat diffusing element 32 is made of metal, preferably copper, and generally can be any highly heat conductive metal such as a beryllium-copper alloy or aluminum. The element 32 serves to diffuse the heat that is conducted from the cooling surfaces 24 and 26. In terms of the diffusing function of the element 32 the wedge-shaped configuration widens out from the 2 millimeter wide input area 36 juxtaposed the faces 24 and 26 to a 1 cm output area 38 where the diffusing element engages a heat discharging structure 33. Given a 3 cm length laser medium, the diffuser serves to significantly reduce the heat flux per unit area of contact in order to reduce the heat load on the heat conductive assembly 14. As a working example, the laser medium which is 2 millimeters wide and 3 cm long can generate 28 watts of heat, 14 watts per cooling face portion. The heat flux at the laser medium interface 36 is 23 watts per square cm and an output in the interface area 38 is 4.6 wafts per $cm^2$. The objective of diffusing the heat load is to be able to use heat pipes that have a removal capacity of about 10 watts per $cm^2$ or to use phase change material or other heat dissipating structures to discharge the heat. For example, liquid type heat exchangers or fin type radiators may be used to discharge the collected heat.

Figure 2:
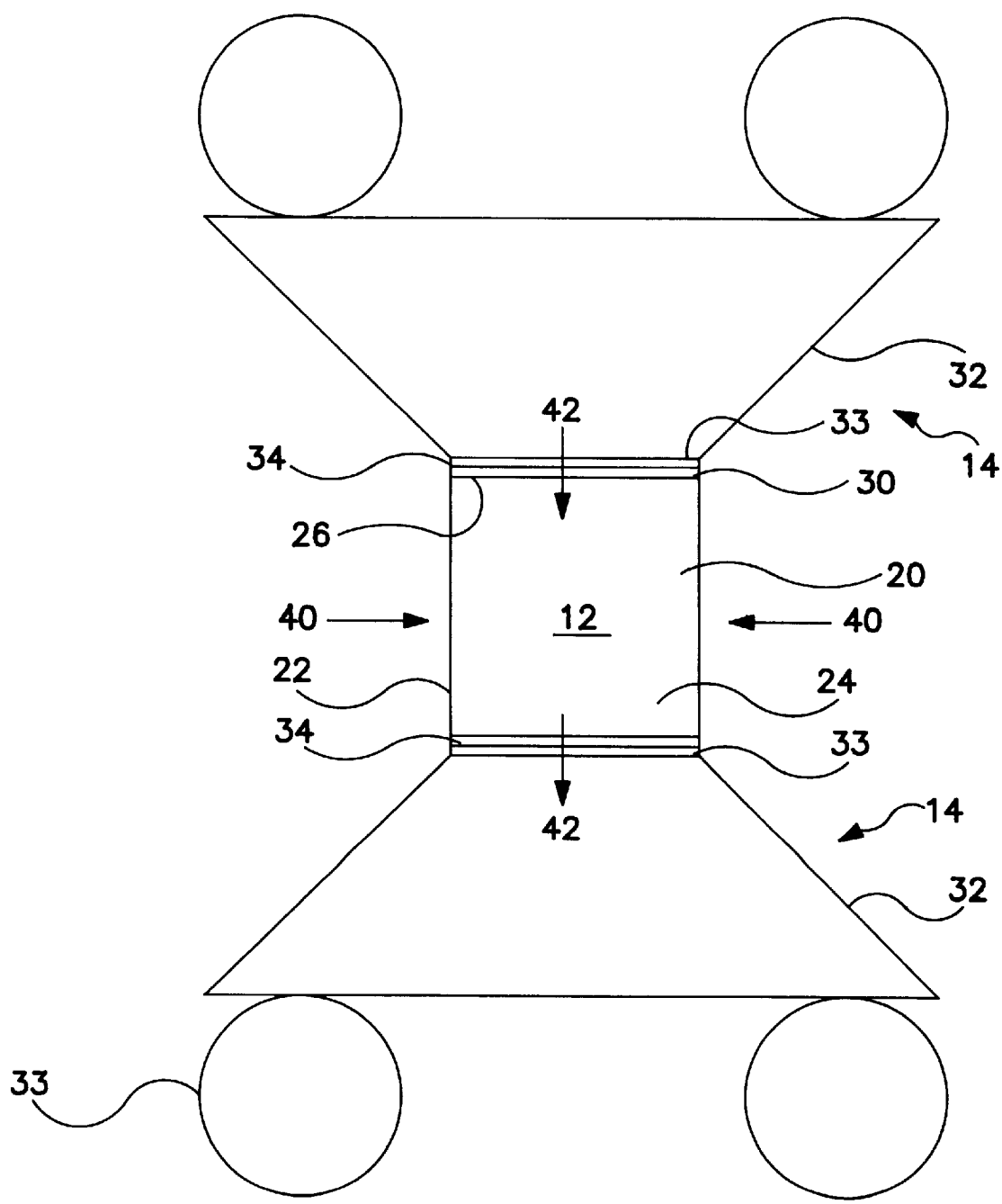
FIG. 2 is a front elevation of the perspective of FIG. 1 illustrating the geometry of the pumping and cooling functions.

Referring now to FIG. 2, there is shown the preferred geometric relationship to the laser medium face portions of the passive heat conductive assembly 14 and the optical pumping arrays 16 that result in high beam quality as expressed in Equation 1. The arrows 40 and 42 show the direction of the optical pumping input to the laser medium and the face portion locations of the heat conductive assembly respectively. The paths of the excitation energy provided by optical pumping using the diodes 16 and the cooling by the heat conductive assembly 14 operate in paths that are normal to one another. The cooling face portions 24 and 26 are coated with the evanescent wave coating 30 (FIG. 1A). The face portions 20 and 22 are subjected to a surface grinding operation to roughen the surface and thereby diffuse the radiation entering the laser medium. It has been found that diffusing the radiating energy through the roughened surface or diffused face portions 20 and 22 offers the advantages of spreading out the radiation so that it is more effective.

Figure 3:
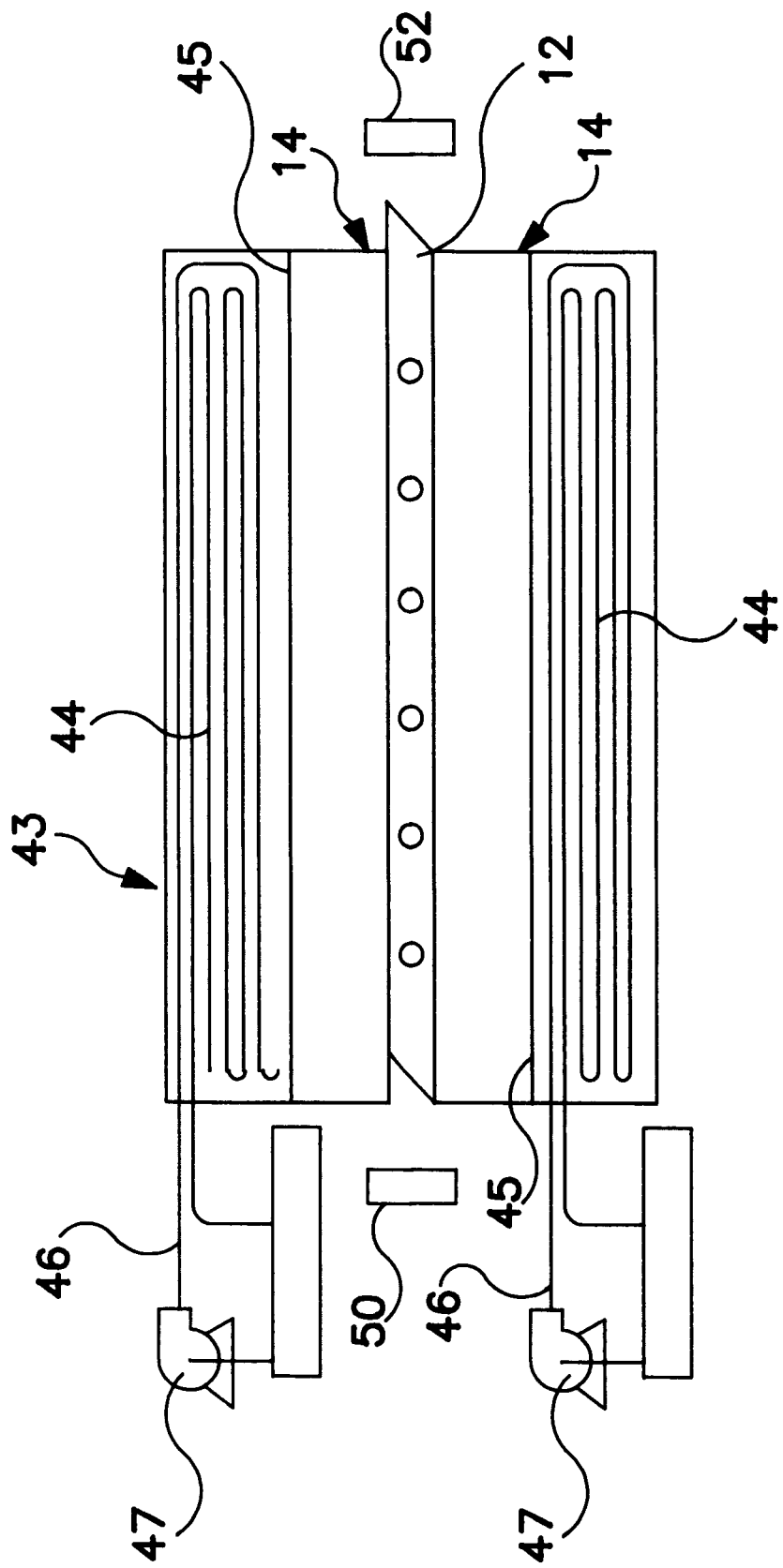
FIG. 3 is a side elevation of the laser medium having affixed the thermally conductive assembly including the means for dissipating the heat from the conductive assembly using a fluid heat exchanger.

The construction of the passive conductively cooled laser that uses cooling fluid to dissipate heat is shown in FIG. 3. Affixed to the diffuser element 14 is a heat exchanger device identified generally as 43 that comprises a series of fluid channels 44 in heat conductive contact with the surface 45 of the diffuser. As the diffuser picks up heat from the laser medium 12, it is cooled by the circulating fluid 46 flowing through the channels 44 which are in conductive contact with the surface of the diffuser 45. Appropriate pump means 47 circulates the fluid 46 through the exchanger 43. The channels 44 are unshielded and exposed to ambient conditions and thereby dissipate the heat to ambient space. It will be appreciated that the foregoing description of the heat exchanger 43 presents no risk of contaminating the laser medium by virtue of being affixed only to the diffuser 14.

Figure 4:
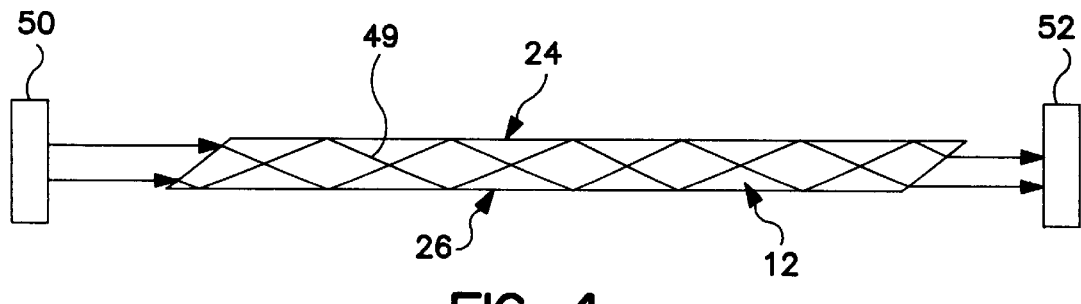
FIG. 4 is a schematic illustrating the zig-zag path of the wave form that is propagated through the laser crystal medium.

FIG. 4 illustrates the zig-zag path of the beam 49 within the laser crystal medium. As shown in FIG. 1 at the front end and back end exterior of the laser medium there is provided reflective surfaces 50 and 52 that cause the lasing beam to pass back and forth longitudinally through the crystal medium 12. As the optical pumping proceeds, the medium begins to lase and the radiation is internally reflected off the internal surfaces 20 and 22 (FIG. 2) at an angle. The angular reflection is due to the index of refraction of the lasing crystal which results in the zig-zag propagation. As the wave front cycles back and forth between the reflective surfaces at each end, it achieves gain and at the appropriate power level exits the medium.

The geometry of treating the laser medium as illustrated in FIG. 2 achieves uniform radiation to initialize lasing and the passive heat conductive cooling is effective to maintain a low value of OPD taken as the root mean square of the amplitude of the propagated wave form. A near planar wave front will have a value of 3 or less for the exponent of the beam quality Equation 1 and the beam quality value would be unity.

Although the present invention has been described in considerable detail with reference to certain preferred versions thereof, other versions are possible. It is intended to cover all modifications, alternatives and equivalents which may fall within the spirit and scope of the invention as defined in the appended claims.

What is claimed is:

1. An optically pumped laser comprising a solid state laser medium adapted to generate a laser beam wave form that is propagated uniformly in a zig-zag path by internal reflection through the medium, said laser medium having first face portions through which the laser medium is excited and second cooling face portions through which the laser medium is passively cooled;

said first face portions having directed thereagainst radiation for exciting the laser medium to generate the laser beam; and means comprising a heat conductive assembly for discharging heat into the ambient surrounding, said conductive assembly being affixed to said second face portions by a heat conductive adhesive layer, said heat conductive assembly including an evanescent layer positioned between the heat conductive adhesive layer and the solid state laser medium, said evanescent layer providing protection to the second face portions from the adhesive layer;

thereby minimizing the temperature variation within the laser medium encountered by said wave form.

2. The invention as claimed in claim 1 wherein the heat conductive assembly includes at least a heat conductive diffusing element.

3. The invention as claimed in claim 2 wherein the heat conductive diffusing element is formed of copper.

4. The invention as claimed in claim 1 wherein the second face portions are polished surfaces.

5. The invention as claimed in claim 1 wherein the surfaces; of the first face portions are roughened to provide a diffuse surface.

6. The invention as claimed in claim 1 wherein the heat conductive assembly has a truncated configuration providing a higher level of heat density per unit area adjacent the second face portion and a lower level of heat density per unit area opposite the second face portion.

7. The invention as claimed in claim 6 wherein the ratio of the higher level of heat density per unit area to the lower level of heat density per unit area is in the range of 4:1 to 8:1.

8. The invention as claimed in claim 1 wherein the heat conductive assembly comprises a heat diffusing element and heat discharge means in conductive contact with the heat diffusing element.

9. The invention as claimed in claim 1 wherein the conductive heat assembly comprises a copper heat diffusing element bonded to the second face portion by the heat conductive adhesive layer and a heat discharge means affixed to the heat conductive copper heat diffuser element for discharging the heat into the ambient space.

10. The invention as claimed in claim 9 wherein the heat conductive adhesive layer is a silicone based heat curable resin.

11. The invention as claimed in claim 1 wherein the evanescent coating is silicon dioxide.

12. The invention as claimed in claim 1 wherein the solid state laser medium is comprised of neodymium yag crystal.

13. An optically pumped laser generating system comprising an elongated solid state crystal slab having top, bottom and side face portions and lead end and back end face portions; said optically pumped laser generating system being adapted to generate a laser beam wave form uniformly propagated through the slab in a zig-zag path from the lead end to the back end, said laser beam wave form being susceptible to different propagation rates as a result of temperature variations encountered by the laser wave form through the slab, said laser generating system comprising:

a passive heat conductive assembly affixed by a heat conductive adhesive layer to the top and bottom face portions of the crystal slab for collecting and diffusing the heat generated in said slab, said heat conductive assembly including an evanescent layer positioned between the heat conductive adhesive layer and the solid state crystal slab, said evanescent layer providing protection to the top and bottom face portions from the adhesive layer;

an array of laser emitting diodes for optically pumping the slab directed against each of the side face portions, said side face portions being roughened to diffuse the incident pumped radiation; and reflecting surfaces adjacent the lead end and back end face portions for reflecting the laser beam back and forth through the slab to increase the beam power level;

whereby the passive heat conductive assembly discharges the heat generated in the slab to minimize the temperature variation through the slab.

14. The invention as claimed in claim 13 wherein the crystal slab is neodymium yag crystal.

15. The invention as claimed in claim 13 wherein the heat conductive assembly includes a truncated diffuser element having a higher level of heat density per unit area adjacent each of the top and bottom face portions and a lower level of heat density per unit area adjacent a heat discharging means positioned on the truncated diffuser element opposite to the top and bottom face portions.

16. The invention as claimed in claim 15 wherein the heat discharging means is a heat pipe.

17. The invention as claimed in claim 15 wherein the heat discharging means comprises heat radiating fins.

18. The invention as claimed in claim 15 wherein the heat discharging means is a fluid type heat exchanger.

19. The invention as claimed in claim 13 wherein the heat conductive adhesive layer is a silicone based compound formulated with boron nitride.

20. The invention as claimed in claim 13 wherein the evanescent layer is silicon dioxide to enhance the extent of the total internal reflection of the incident laser diode radiation directed to the face portions.

21. An optically pumped laser comprising a solid state laser medium adapted to generate a laser beam wave form that is propagated uniformly in a zig-zag path by internal reflection through the medium, said laser medium having first face portions through which the laser medium is excited and second cooling face portions through which the laser medium is passively cooled;

said first face portions having directed thereagainst radiation for exciting the laser medium to generate the laser beam;

said second face portions having affixed thereto a heat conductive assembly by a heat conductive adhesive layer, said assembly including a truncated diffusing element for passively removing heat generated within the laser medium, including means for dissipating the heat into the surrounding space, said heat conductive assembly including an evanescent layer positioned between the heat conductive adhesive layer and the solid state laser medium, said evanescent layer providing protection to the second face portions from the adhesive layer;

said heat conductive assembly providing a higher level of heat density per unit area adjacent the second face portion and a lower level of heat density per unit area adjacent the heat dissipating means; and means for dissipating heat from the heat diffusing element comprising heat pipes, thereby minimizing the temperature variation within the laser medium encountered by said wave form.

\* \* \* \* \*